(12) United States Patent
Holland et al.

(10) Patent No.: US 6,304,645 B1
(45) Date of Patent: Oct. 16, 2001

(54) CALL PROCESSING SYSTEM WITH RESOURCES ON MULTIPLE PLATFORMS

(75) Inventors: John Holland, Tirongi; Paul Ranford, Mt. Albert; Peter Robson, Auckland, all of (NZ)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/518,966

(22) Filed: Mar. 4, 2000

(51) Int. Cl.$^7$ .............................. H04M 1/00; H04M 3/42
(52) U.S. Cl. ................... 379/157; 379/165; 379/201.02; 379/201.05; 379/88.18
(58) Field of Search ...................... 379/88.01, 196–198, 379/243, 244, 201, 265–269, 157, 207, 220, 88.18; 370/352, 401, 905, 395

(56) References Cited

U.S. PATENT DOCUMENTS

| | | | |
|---|---|---|---|
| 4,959,854 | * | 9/1990 | Cave et al. ........................... 379/157 |
| 5,471,521 | * | 11/1995 | Minakami ........................ 379/88.18 |
| 5,555,288 | * | 9/1996 | Wilson et al. ..................... 379/88.01 |
| 6,098,043 | * | 8/2000 | Forest et al. .......................... 704/270 |
| 6,118,862 | * | 9/2000 | Dorfman et al. ..................... 379/201 |

* cited by examiner

Primary Examiner—Fan Tsang
Assistant Examiner—Ovidio Escalante
(74) Attorney, Agent, or Firm—Kaplan & Gilman, LLP

(57) ABSTRACT

A call processing system is disclosed wherein plural platforms are populated with plural voice boards different resources thereon. Whenever a functional component on a server is requested to start operating for carrying out a particular function as requested by a call, polling software on said server runs to poll from the platforms the availability information of the corresponding resource required for said function requested by the call.

22 Claims, 1 Drawing Sheet

CALL PROCESSING SYSTEM WITH RESOURCES ON MULTIPLE PLATFORMS

TECHNICAL FIELD

This invention relates to a voice processing system, and more particularly, to an improved call processing architecture that permits a server or servers to allocate resources required to process a call based on updated availability information of resources polled from the platforms for that call.

BACKGROUND OF THE INVENTION

Voice processing systems have become prevalent in modern day society. Such systems typically involve a telephone caller dialing into a computerized integrated voice response (IVR) system. The interaction between the remote user dialing in and the computerized system varies widely and is application specific. Typical examples of such systems include banking systems which allow a user to transfer funds between accounts and ascertain account balances, credit card corporation systems, etc.

Recently, it has also become popular to merge together these voice processing systems with facsimile, e-mail and other capabilities. One such example is what is termed fax-on-demand. In fax-on-demand systems, a remote user dials in to a computer and enters through his telephone keypad the digits corresponding to a particular item or product number. Additionally, a facsimile number may be entered via a touch tone keypad, and is interpreted by this system. The fax-on-demand system then transmits documentation regarding the particular item or product to a facsimile machine located at the specified remote telephone number.

In view of the evolving and complex nature of many of today's modern voice or call processing systems, it has become standard to construct such voice processing systems from a plurality of different client applications. The voice processing applications may include fax-on-demand, voice mail, etc., all interconnected via a local area network or other such means.

It has also become fairly standard to utilize voice processing resources flexibly between calls. For example, typical voice processing resources include such items as tone detectors for detecting the digits entered via a DTMF keypad, echo cancellors for filtering echo from the telephone network, voice recognition software for allowing a remote user to input commands via voice, etc.

One problem with such systems is that the voice processing applications, as well as the resources, tend to vary widely in their design and implementation. Multiple vendors each implements their systems differently and it is difficult for these items to work together. Additionally, the systems are not very flexible because there usually exists a set of circuit boards on a single platform for implementing all of the required call processing functions. Once the resources on the platform are used up, calls simply cannot be processed and are instead blocked.

The other problem comes from the use of redundant servers to achieve fault tolerance at the server level by shadowing between a primary functional component on a server and its standby functional component on another server. Both the servers keep the same record of availability information of the required resources on the platforms by synchronization process at an interval of time, so that the standby functional component can take over the tasks previously carried out by the primary component when the latter stops operating. However, the record for the standby component may be out-of-date if the call has changed its requested services after last synchronization since the synchronization is always implemented at an interval of time.

In view of the foregoing, there exists a need in the art for a more flexible and configurable voice processing system which can optimally utilize the resources of a variety of different vendors in a variety of different configurations. The system should also permit an application to operate irrespective of different types of locations of resources (tone detectors, signal generators, etc.) that are being used to implement the voice processing application. Furthermore, the system should also permit the resources be selected based on an up-to-date information on availability of the required resources whenever a functional component on a server is required to start operating.

SUMMARY OF THE INVENTION

The above and other problems of the prior art are overcome and a technical advance is achieved in accordance with the present invention which relates to a more flexible user configurable and higher capacity multiple platform voice processing system. In accordance with the invention, a plurality of call processing resources are arranged on various circuit cards (i.e., voice processing cards). A plurality of such cards are installed into a particular voice processing platform.

A plurality of voice processing applications, possibly running on different computers, communicates with one or more CT servers which query all of the different voice processing resources and configures the required resources for processing a particular call. The resources may be from different vendors, from the same or different voice processing boards, from the same or different voice processing platforms, and may change during the duration of any particular call. The entire configuration of the voice processing resources is isolated from, and invisible to, the voice processing application. As a result, the application can operate in an identical manner whether voice processing resources are allocated to process the particular call are allocated from the same or different locations.

Each of the servers includes polling software and allocation software. For each call, the polling software polls from the platforms information on availability of the resources required for processing the call and the allocation software allocate the resources based on the information polled by the polling software. Each of the CT servers also has a plurality of functional components for carrying out specific respective functions for calls.

The functional components comprise primary functional components and their counterpart standby functional components each of which is kept shadowed until its counterpart primary functional component stops operating. Such, fault tolerance at the server level is achieved by shadowing between the primary and standby functional components. Whenever a primary functional component stops operating, the polling software on the server accommodating its counterpart standby component runs to poll the platforms for the availability information on the required resources. The allocation software on this server runs for allocating the resources, based on the newly polled availability information, for the standby component. The standby component begins to work and takes over the task previously carried out by the stopped primary component.

DETAILED DESCRIPTION OF THE PREFERRED EMBODIMENT

Figure 1:
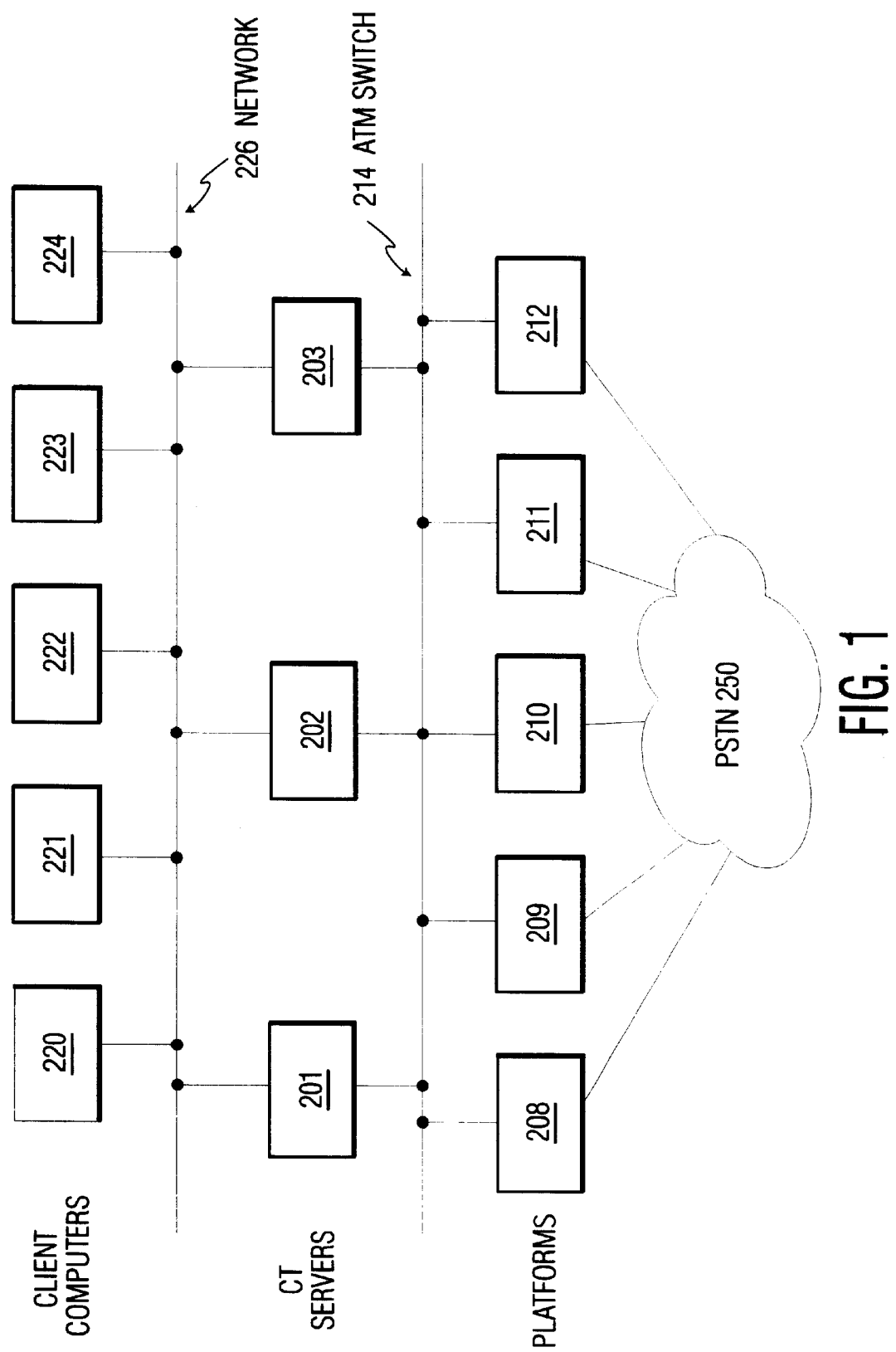
FIG. 1 shows a conceptual block diagram of an exemplary embodiment of the present invention.

FIG. 1 shows an exemplary functional diagram for implementing teachings of the present invention. The arrangement in FIG. 1 includes a plurality of client personal computer based systems 220–224 all connected via a network 226 and in communication with CT servers 201–203. The PC based systems run a variety of voice processing and call center applications which vary greatly from system to system. The particular techniques utilized by each of these systems is not critical to the present invention.

Additionally, voice processing platforms 208–212 communicate with CT servers 201 and 202 via a network and a standard S.300 or other type of protocol. The platforms 208–212 may also be interconnected with each other via an ATM switch 214 or other switch arrangement so as to improve voice processing quality.

Polling software and allocation software run on each of CT servers 201–203. Each of CT servers also accommodates a plurality of processors having functional components for carrying out respective functions for telephone calls. Some of the functional components are called primary functional components, while the other are called standby functional components that corresponds to respective primary functional components. Every standby functional component is kept shadowed until its counterpart primary functional component stops operating or works properly. Such, fault tolerance at the server level is achieved by shadowing between a primary functional component and its standby functional component.

It is appreciated that the arrangement of the functional components on the processors or servers is not critical to the present invention. For example, in an arrangement, each processor may include only one functional component, either primary or standby. In another arrangement, some processor may include both of primary components and standby components. A server may only accommodate either primary components or standby components, or may accommodate both some primary components and some standby components. In any case, it is an obvious advantage that a primary component and its standby component are not accommodated on the same processor or the same server.

Even though three CT servers 201–203 are shown in FIG. 1, the number of CT servers are not critical to the present invention. Furthermore, it is not necessary each of the primary functional components has a counterpart standby functional component, but it is preferably that at least the primary components carrying out important functions shall have their standby counterparts.

In operation, a call arrives from the remote user over public switch telephone network (PSTN) 250 and is received through one of call processing platforms 208–212. The CT servers 201–203 receive the call and connect appropriate application 220–224 to the call. The CT servers then analyze the call in response to messages received from the application in order to ascertain the particular group of resources which is required to process the particular call. Depending upon the call and/or the application, these resources may include items such as tone generators, speech recognition algorithms, echo cancellors, or any other of a variety of potential resources for processing various aspects of any particular call. The assembling, modification, and disassembling of the group of resources is described in U.S. Pat. No. 5,608,791 issued to the assignee of the present invention.

Based upon the particular arriving call and the application, the CT servers 201–203 determine which particular resource types are necessary in order to process the call. In particular, the polling software runs on the servers 201–203 to poll from the platforms 208–212 availability of the required group of resources. With the availability information polled by the polling software, the allocation software on the servers 201–203 runs to pick the resources and configure them into a logical group so that the call may be processed by those resources. Each of those resources communicates with the CT servers 201–203 via the S.300 standard protocol, and thus, the resources may be from different vendors, yet still be utilized to process a single call. Moreover, the application is unaware of the particular resource utilized and whether those resources are located on the same board, platform, or remotely from one another.

The polling software may poll the platforms in an order that it polls a first platform to obtain a list of available required resources, and then check a second platform for the remaining required resources that are not available on the first platform, and then check the next platform, and so on, until all the required resources are found.

The polling software may also poll in any other predetermined optimal order. For example, the polling software may poll the availability of all the required resources on each of the platforms and stops whenever a platform including all the resources is found.

A priority scheme is utilized in order to attempt to allocate the resources. For example, the allocate may attempt to allocate as many of the resources as possible, if not all of them, on the same board. Since the polling software on CT servers 201–203 has obtained a list of all of the different resources and where they are located, this can be attempted first. If the resources are not available on the same board, the allocation software attempts to locate them on the same platform, and ultimately, on different platforms only if necessary.

Many factors may be taken into account in determining a priority scheme for allocating the resources. These factors may include location of the resources, the traffic patterns, the scarcity of certain resources, etc.

If a primary functional component (e.g., on server 201) stops operating and its shadowed standby functional component (e.g., on server 202) now begins to work, the polling software on server 202 runs to poll the availability information for the required resources from the platforms. Therefore, the availability information or resources provided to this standby component on server 202 is independent to that in server 201 and is therefore always updated when the standby component on server 202 begins to work No synchronization between the servers 201 and 202 on availability information of the resources is carried out or needed.

When the group of resources for the particular call is changed because a new service is requested during the call, the polling software on the server accommodating relevant primary functional component carrying out this new service or function runs again so as to poll from the platforms the availability information of the newly required resource. The polling software may only check the availability of the newly added resources or go through all the required resources again in the same way as when a new call is received.

The above describes the preferred embodiment of the invention. Various other modifications and additions are apparent to those of skill in the art, and such modifications are intended to be covered by the following claims.

What is claimed:

1. A voice processing system for connection to the public switched telephone network comprising:

a plurality of client computers containing voice processing applications;

a plurality of platforms, each of said platforms containing a plurality of voice processing resources, the resources being on one or more circuit boards;

one or more computer telephony servers, each having a plurality of processors for interfacing to said client computers and said platforms for determining what set of resources a particular telephone call being processed requires;

a plurality of functional components comprising primary functional components and counterpart standby functional components accommodated on said processors for carrying out respective functions requested by said call, each of said standby functional components being kept shadowed until its counterpart primary functional components stops operating so as to act instead of said counterpart primary functional components;

polling software running on said servers for polling from said platforms information on availability of said set of resources required for processing said particular telephone call; and allocation software running on said servers for allocating said set of resources, either from the same or from different platforms, based on said availability information from said polling software;

wherein said polling software on a server runs to poll said information on availability of said required resources whenever a new functional component on said server begins to work during said call to carry out its function required by said call.

2. The system of claim 1 wherein said polling software is configured to poll from each of said plurality of platforms for availability of all the required resources.

3. The system of claim 2 wherein said polling software is configured to stop polling whenever a platform including all of said resources required for said call is found.

4. The system of claim 1 wherein said polling software is configured to poll from the platforms in an order that it poll a first platform for availability of all of said required resources, and then poll a second platform for availability of remaining resources that are not available in said first platform, and so forth, until all of said required resources are found.

5. The system of claim 4 wherein there are at least two servers and each of said primary functional components and its standby counterpart are accommodated by different servers.

6. The system of claim 1 wherein there are at least two servers and each of said primary functional components and its standby counterpart are accommodated by different servers.

7. The system of claim 5 wherein each of said servers accommodates either only said primary functional components or only said standby functional components.

8. The system of claim 1 wherein each of said servers accommodates either only said primary functional components or only said standby functional components.

9. The system of claim 1 wherein said servers and said platforms communicate using an S.300 protocol.

10. The system of claim 1 wherein each of said platforms are interconnected with others of said platforms.

11. The system of claim 1 wherein the platforms are connected by an ATM switching arrangement, said ATM switching arrangement being configured to facilitate exchange of a real time media stream among said platforms.

12. The method of claim 1 wherein said new functional component is either a primary functional component or a standby functional component.

13. A method of processing a telephone call in a call processing system, the method comprising the steps of:

connecting one or more computer telephony servers between a plurality of platforms containing a plurality of call processing resources and a plurality of client computers running call processing applications, said servers accommodating a plurality of functional components comprising primary functional components and counterpart standby functional components for carrying out respective functions required by said call, each of said standby functional components being kept shadowed until its counterpart primary components stops operating;

sending from said call processing applications to said servers, upon receipt of a particular call, an instruction on what group of resources are required for processing said call and what set of functional components are required to work for processing said call;

running polling software on said servers accommodating said required functional components, upon receipt of said instruction, to poll from said platforms information on availability of said group of resources on said platforms; and allocating, based on said availability information polled by said polling software, said group of resources from same or different platforms, wherein whenever a new functional component begins to work during said call, said polling software on a server accommodating said new functional component runs to poll said information on availability.

14. The method of claim 13 wherein said polling step is carried out to poll from each of said plurality of platforms for availability of all said required resources.

15. The method of claim 14 wherein said polling step stops whenever a single platform including all resources required for said call is found.

16. The method of claim 13 wherein said polling step comprising steps of polling a first platform of said plurality of platforms for availability of all required said resources, and then polling a second platform of said plurality of platforms for availability of remaining resources that are not found available on said first platforms, and so forth, until all the required resources are found.

17. The method of claim 13 wherein said allocating step is carried out by running allocation software on said server in a priority scheme.

18. The method of claim 13 wherein said polling software on one of said servers runs when a standby component on said server is requested to start operating instead of its primary component.

19. The method of claim 13 wherein said polling software on one of said servers runs when a primary component on said server is requested to start operating because of a new service is requested during said call.

20. The method of claim 13 wherein said new functional component is either a primary functional component or a standby functional component.

21. The method of claim 20 wherein said new functional component is a standby functional component which begins to work when its counterpart functional component stops operating during said call.

22. The method of claim 20 wherein said new functional component begins to work when a new service is requested during said call.

\* \* \* \* \*